United States Patent
Hirota et al.

(10) Patent No.: US 8,184,179 B2
(45) Date of Patent: May 22, 2012

(54) IMAGE PROCESSING APPARATUS, IMAGE PROCESSING METHOD, AND PROGRAM FOR COMBINING STILL IMAGES

(75) Inventors: Yoichi Hirota, Kanagawa (JP); Hiroshi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 540 days.

(21) Appl. No.: 12/177,478

(22) Filed: Jul. 22, 2008

(65) Prior Publication Data

US 2009/0027512 A1 Jan. 29, 2009

(30) Foreign Application Priority Data

Jul. 23, 2007 (JP) ................................. P2007-191172

(51) Int. Cl.
- *H04N 5/262* (2006.01)
- *H04N 9/74* (2006.01)
- *G06K 9/36* (2006.01)
- *G06K 9/46* (2006.01)

(52) U.S. Cl. .......... 348/239; 348/578; 382/284; 382/236
(58) Field of Classification Search .................. 348/239; 382/304
See application file for complete search history.

(56) References Cited

U.S. PATENT DOCUMENTS

| | | | |
|---|---|---|---|
| 6,362,850 B1 * | 3/2002 | Alsing et al. ................... | 348/239 |
| 2004/0091240 A1 * | 5/2004 | Takei .............................. | 386/46 |
| 2004/0179600 A1 * | 9/2004 | Wells et al. .............. | 375/240.12 |

* cited by examiner

*Primary Examiner* — Albert Cutler
(74) *Attorney, Agent, or Firm* — Frommer Lawrence & Haug LLP; William S. Frommer; Thomas F. Presson

(57) ABSTRACT

An image processing apparatus includes the following elements. An obtaining unit obtains a first still image, a first difficulty level indicating a complexity of the first still image, a second still image, and a second difficulty level indicating a complexity of the second still image. A combining unit combines the first and second still images at a combination ratio which is changed along a time axis to generate a moving image. An encoding unit encodes the moving image. A moving-image difficulty-level calculating unit calculates a moving-image difficulty level indicating a complexity of the moving image according to the first and second difficulty levels and the combination ratio changed along the time axis. A control unit controls a characteristic of a process of encoding the moving image according to the combination ratio changed along the time axis and the moving-image difficulty level.

7 Claims, 8 Drawing Sheets

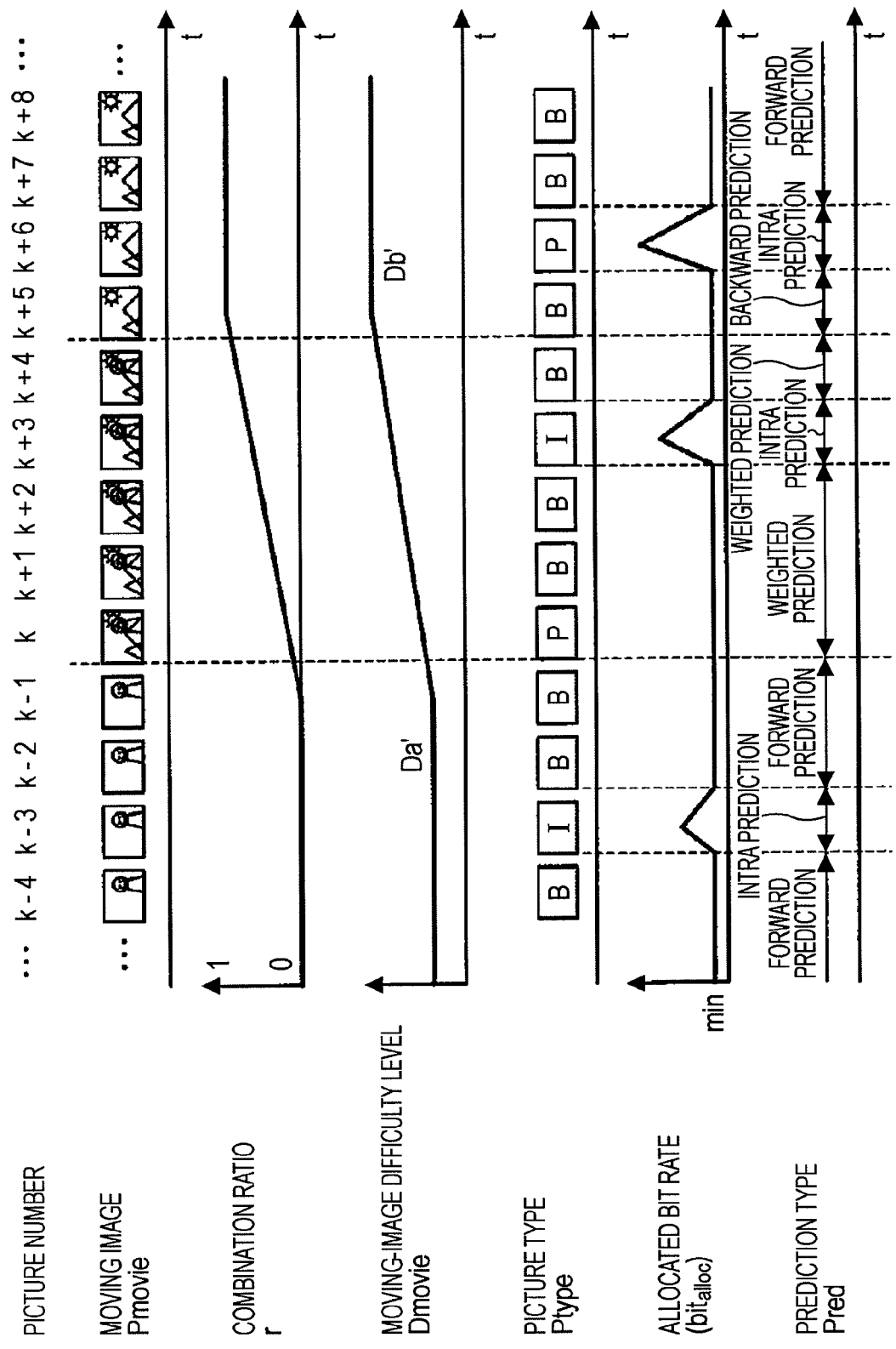

IMAGE PROCESSING APPARATUS, IMAGE PROCESSING METHOD, AND PROGRAM FOR COMBINING STILL IMAGES

CROSS REFERENCES TO RELATED APPLICATIONS

The present invention contains subject matter related to Japanese Patent Application JP 2007-191172 filed in the Japanese Patent Office on Jul. 23, 2007, the entire contents of which are incorporated herein by reference.

BACKGROUND OF THE INVENTION

1. Field of the Invention

The present invention relates to an image processing apparatus and method for combining a plurality of still images to generate a moving image and encoding the moving image, and to a program for causing a computer to execute such image processing.

2. Description of the Related Art

Recently, special video effects have been applied to still images captured using devices such as digital cameras. Processing for applying special video effects is generally classified into the following two process groups.

A first process group includes processes for correcting the image quality of a still image. Examples of the processes include conversion of a still image from color to monochrome, production of a sepia-tone image from a still image, application of soft focus effect to a still image, enhancement of the outline of a still image to sharpen the still image, and addition and removal of noise to and from a still image.

A second process group includes processes for combining a plurality of still images and changing a combination ratio along a time axis to provide temporal transition from one of the still images to another one of the still images. Examples of the processes include a scene cut for providing instantaneous change from a certain still image to another still image, and scene crossfade for providing temporally gradual change from a certain still image to another still image.

An image processing apparatus uses a combination of the above first and second processes to display a moving image with a plurality of still images subjected to a desired video effect.

The image processing apparatus further encodes the generated moving image according to an encoding method such as Advanced Video Coding (AVC) so that the moving image can be stored in a predetermined storage medium with the storage capacity thereof being effectively utilized.

Moving images generated from video material such as still images as described above or computer graphics have higher quality than typical moving images such as video sequences, and a degradation of the image quality of such higher-quality moving images would tend to become more pronounced when the moving images are encoded.

Japanese Unexamined Patent Application Publication No. 8-305895 describes a moving-image encoding apparatus in which when a moving image made of computer graphics material is encoded, a coordinate transformation matrix of each polygon is used to precisely detect a motion vector to thereby encode the moving image at a higher quality.

SUMMARY OF THE INVENTION

As described above, an image obtained by encoding a moving image that is generated by applying a special video effect to a plurality of still images is generated from still images having no motion component, unlike a typical moving image or a moving image made of computer graphics material as described above. Furthermore, such an image is generated from higher-definition still images than those of a typical moving image, and can therefore involve a visually more pronounced degradation in image quality than an image obtained by encoding a general moving image.

It is therefore desirable to provide an image processing apparatus and method for encoding a combined image or moving image, which is generated by combining a plurality of still images, using a simple technique while maintaining a high level of image quality to generate encoded data, and to provide a program for causing a computer to execute such image processing.

According to an embodiment of the present invention, an image processing apparatus includes the following elements. Obtaining means obtains a first still image, a first difficulty level indicating a complexity of the first still image, a second still image, and a second difficulty level indicating a complexity of the second still image. Combining means combines the first still image and second still image obtained by the obtaining means at a combination ratio which is changed along a time axis to generate a moving image. Encoding means performs an encoding operation to encode the moving image generated by the combining means. Moving-image difficulty-level calculating means calculates a moving-image difficulty level indicating a complexity of the moving image according to the first difficulty level and second difficulty level obtained by the obtaining means and the combination ratio changed along the time axis. Control means controls a characteristic of the encoding operation performed by the encoding means according to the combination ratio changed along the time axis and the moving-image difficulty level calculated by the moving-image difficulty level calculating means.

According to another embodiment of the present invention, an image processing method includes the steps of obtaining, using predetermined obtaining means, a first still image, a first difficulty level indicating a complexity level of the first still image, a second still image, and a second difficulty level indicating a complexity level of the second still image; combining the first still image and the second still image at a combination ratio which is changed along a time axis to generate a moving image; calculating a moving-image difficulty level indicating a complexity level of the moving image according to the first difficulty level, the second difficulty level, and the combination ratio changed along the time axis; setting an encoding control parameter according to the combination ratio changed along the time axis and the moving-image difficulty level; and encoding the moving image according to the encoding control parameter.

According to another embodiment of the present invention, a program causes a computer to execute image processing including the steps of obtaining, using predetermined obtaining means, a first still image, a first difficulty level indicating a complexity level of the first still image, a second still image, and a second difficulty level indicating a complexity level of the second still image; combining the first still image and the second still image at a combination ratio which is changed along a time axis to generate a moving image; calculating a moving-image difficulty level indicating a complexity level of the moving image according to the first difficulty level, the second difficulty level, and the combination ratio changed along the time axis; setting an encoding control parameter according to the combination ratio changed along the time axis and the moving-image difficulty level; and encoding the moving image according to the encoding control parameter.

Accordingly, a characteristic of a process of encoding a moving image is controlled according to a combination ratio which is changed along a time axis of a moving image and a difficulty level of the moving image. It is therefore possible to encode a combined image or moving image, which is generated by combining a plurality of still images, using a simple technique at a high encoding efficiency while maintaining a high level of image quality to generate encoded data.

BRIEF DESCRIPTION OF THE DRAWINGS

FIG. 8 is a diagram showing an operation of the encoding control unit for setting an encoding control parameter for a moving image involving a scene fade.

DESCRIPTION OF THE PREFERRED EMBODIMENTS

An image processing apparatus according to an embodiment of the present invention is configured to combine a plurality of still images to generate a combined image, or moving image, and to encode the moving image. An embodiment of the present invention will be described in the context of an image processing apparatus 1 shown in FIG. 1.

Figure 1:
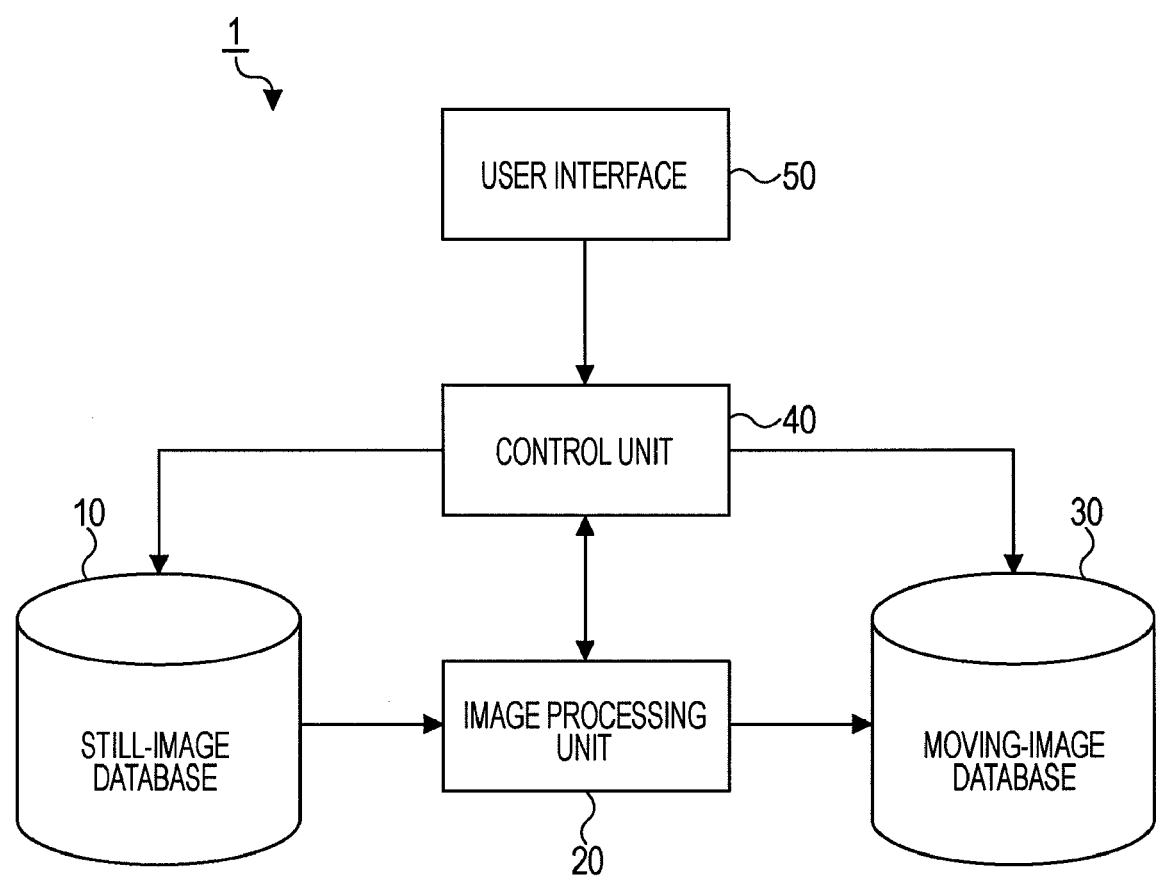
FIG. 1 is a diagram showing an overall structure of an image processing apparatus according to an embodiment of the present invention.

As shown in FIG. 1, the image processing apparatus 1 includes a still-image database 10, an image processing unit 20, a moving-image database 30, a control unit 40, and a user interface 50.

The still-image database 10 is a storage area included in a storage medium such as a hard disk, and manages a plurality of still image data items captured using a device such as a digital camera. Specifically, the still-image database 10 has a predetermined storage area in which a plurality of still image data items and still-image difficulty levels each indicating a complexity level of one of the still image data items are managed in association with each other. For example, the still-image database 10 supplies still image data items Pa and Pb designated by still-image selection setting information supplied from the control unit 40, which will be described below, and two still-image difficulty levels Da and Db associated with the still image data items Pa and Pb, respectively, to the image processing unit 20.

The still-image database 10 and the moving-image database 30, which will be described below, may share a single storage medium and may be formed in different storage areas of the single storage medium.

Each of the still-image difficulty levels Da and Db is determined on the basis of an analysis result obtained by analyzing the complexity of an image or on the basis of information such as the size of an image file. The still-image difficulty levels Da and Db may be determined by the control unit 40 when the still image data items Pa and Pb are selected on the basis of the still-image selection setting information, or may be determined in advance and managed by the still-image database 10 before the start of a process of generating a moving image. In particular, the image processing apparatus 1 can, by determining the still-image difficulty levels Da and Db in advance, reduce the amount of processing per unit time after the start of the process of generating a moving image.

The image processing unit 20 receives the still image data items Pa and Pb read from the still-image database 10, and combines the received still image data items Pa and Pb at a combination ratio which is changed along the time axis to generate moving image data. The image processing unit 20 further encodes the generated moving image data, and supplies the encoded data to the moving-image database 30.

The moving-image database 30 is a storage area included in a storage medium such as a hard disk, and manages moving image data generated and encoded by the image processing unit 20.

The control unit 40 is a computer including a general-purpose processor such as a central processing unit (CPU), and controls the operation of the still-image database 10, the image processing unit 20, and the moving-image database 30 according to a plurality of types of setting information supplied from the user interface 50, which will be described below.

The user interface 50 supplies setting information concerning an operation of the image processing apparatus 1, which is input by a user, to the control unit 40. The setting information input to the user interface 50 includes, for example, still-image selection setting information, first image-quality setting information, second image-quality setting information, and scene change setting information.

The still-image selection setting information is setting information for designating the still image data items Pa and Pb, which are to be combined to generate moving image data, from a plurality of still image data items managed in the still-image database 10. The first image-quality setting information is setting information for determining an image-quality correction process to be subjected to the still image data item Pa. The second image-quality setting information is setting information for determining an image-quality correction process to be subjected to the still image data item Pb. The image-quality correction processes defined by the first and second image-quality setting information are processes of correcting the image quality of still images, and may include conversion of an image from color to monochrome, production of a sepia-tone image, application of soft focus effect to an image, enhancement of the outline of an image to sharpen the image, and addition and removal of noise to and from an image. The scene change setting information is setting information for defining a timing at which a scene cut or scene fade is performed for a moving image.

In the image processing apparatus 1 having the above-described structure, the control unit 40 loads a plurality of still image data items into the image processing unit 20 from the still-image database 10 according to setting information input through the user interface 50, and controls the image processing unit 20 to combine the plurality of loaded still image data items to generate moving image data. The control unit 40 further writes the generated moving image data in the moving-image database 30.

A structure of the image processing unit 20 will be described with reference to FIG. 2.

The image processing unit 20 includes a first image-quality correction unit 21, a second image-quality correction unit 22, a still-image difficulty-level correction unit 23, a combining unit 24, an encoding unit 25, a moving-image difficulty-level calculation unit 26, and an encoding control unit 27.

The first image-quality correction unit 21 performs image-quality correction processing on the still image data item Pa retrieved from the still-image database 10 on the basis of the first image-quality setting information supplied from the control unit 40. Specific examples of the image-quality correction processing include image-quality correction processes for reducing a difficulty level indicating the complexity of a still image, such as conversion into monochrome, production of a sepia-tone image, soft focus effect, and removal of noise, as described above, and image-quality correction processes for increasing a difficulty level indicating the complexity of a still image, such as sharpening based on enhancement outline and addition of noise. The first image-quality correction unit 21 performs a certain image-quality correction process, which is designated by the first image-quality setting information from among the image-quality correction processes described above, on the still image data item Pa. Then, the first image-quality correction unit 21 supplies still image data subjected to the image-quality correction process (hereinafter referred to as a "still image data item Pa'") to the combining unit 24.

In addition to performing an image-quality correction process on the still image data item Pa, the first image-quality correction unit 21 further sets a correction parameter $\Delta Ea$, configured to correct the difficulty level of the still image data item Pa to a difficulty level of the still image data item Pa', according to the content or strength of the image-quality correction process, and supplies the correction parameter $\Delta Ea$ to the still-image difficulty-level correction unit 23. Specifically, the first image-quality correction unit 21 sets the correction parameter $\Delta Ea$ to a value satisfying $0<\Delta Ea<1$ when an image-quality correction process for reducing a difficulty level of a still image is performed, and sets the correction parameter $\Delta Ea$ to a value satisfying $\Delta Ea>1$ when an image-quality correction process for increasing a difficulty level of a still image is performed.

In the image processing apparatus 1, the first image-quality correction unit 21 may not necessarily perform image-quality correction processing on the still image data item Pa. In a case where image-quality correction processing is not performed, the first image-quality correction unit 21 may be omitted, and the still image data item Pa may be directly supplied to the combining unit 24.

The second image-quality correction unit 22 performs a certain image-quality correction process, which is designated by the second image-quality setting information from among the above-described image-quality correction processes for reducing a difficulty level of a still image and the above-described image-quality correction processes for increasing a difficulty level of a still image, on the still image data item Pb retrieved from the still-image database 10 according to the second image-quality setting information supplied from the control unit 40. The second image-quality correction unit 22 supplies still image data subjected to the image-quality correction process (hereinafter referred to as a "still image data item Pb'") to the combining unit 24.

In addition to performing an image-quality correction process on the still image data item Pb, the second image-quality correction unit 22 further sets a correction parameter $\Delta Eb$, configured to correct the difficulty level of the still image data item Pb to a difficulty level of the still image data item Pb', according to the content or strength of the image-quality correction process, and supplies the correction parameter $\Delta Eb$ to the still-image difficulty-level correction unit 23. Specifically, the second image-quality correction unit 22 sets the correction parameter $\Delta Eb$ to a value satisfying $0<\Delta Eb<1$ when any of the above-described image-quality correction processes for reducing a difficulty level of a still image is performed, and sets the correction parameter $\Delta Eb$ to a value satisfying $\Delta Eb>1$ when any of the above-described image-quality correction processes for increasing a difficulty level of a still image is performed.

In the image processing apparatus 1, the second image-quality correction unit 22 may not necessarily perform image-quality correction processing on the still image data item Pb. In a case where image-quality correction processing is not performed, the second image-quality correction unit 22 may be omitted, and the still image data item Pb may be directly supplied to the combining unit 24.

The still-image difficulty-level correction unit 23 calculates corrected-still-image difficulty levels Da' and Db' using equations (1) and (2) below according to the still-image difficulty levels Da and Db retrieved from the still-image database 10, the correction parameter $\Delta Ea$ supplied from the first image-quality correction unit 21, and the correction parameter $\Delta Eb$ supplied from the second image-quality correction unit 22, and supplies the corrected-still-image difficulty levels Da' and Db' to the moving-image difficulty-level calculation unit 26:

$$Da' = \Delta Ea \times Da \tag{1}$$

$$Db' = \Delta Eb \times Db \tag{2}$$

In a case where the first or second image-quality correction unit 21 or 22 does not perform image-quality correction processing, the image processing apparatus 1 may not necessarily include the still-image difficulty-level correction unit 23. In this case, the still-image difficulty levels Da and Db retrieved from the still-image database 10 may be directly supplied to the moving-image difficulty-level calculation unit 26.

The combining unit 24 combines the still image data item Pa' supplied from the first image-quality correction unit 21 and the still image data item Pb' supplied from the second image-quality correction unit 22 at a combination ratio which is changed along the time axis according to the scene change setting information supplied from the control unit 40 to generate moving image data Pmovie, and supplies the generated moving image data Pmovie to the encoding unit 25. Specifically, the combining unit 24 generates the moving image data Pmovie using equation (3) as follows:

$$P\text{movie} = (r-1) \times Pa' + r \times Pb' \tag{3}$$

where r denotes the value indicating a combination ratio at which the still image data items Pa' and Pb' are combined. When scene change setting information indicating a scene cut for providing instantaneous change from a certain image to another image is supplied, the combining unit 24 immediately changes the value of the combination ratio r from "0" to "1" on a picture-by-picture basis. When scene change setting information indicating a scene fade for providing gradual change from the still image data item Pa' to the still image data item Pb' is supplied, the combining unit 24 gradually changes the value of the combination ratio r from "0" to "1" across a plurality of pictures. The combining unit 24 further supplies information about the combination ratio r changed along the time axis to the moving-image difficulty-level calculation unit 26 and the encoding control unit 27.

The encoding unit 25 encodes the moving image data Pmovie supplied from the combining unit 24 according to an encoding method such as Moving Picture Experts Group 2 (MPEG2) or AVC, and outputs the encoded compressed moving image data to the moving-image database 30. Further, the encoding unit 25 encodes the moving image data Pmovie using an encoding control parameter supplied from the encoding control unit 27, which will be described below.

The encoding control parameter includes, for example, an allocated bit rate $Bit_{alloc}$, a picture type Ptype of each of pictures constituting the compressed moving image data, and a prediction type Pred of each of the pictures.

The allocated bit rate $Bit_{alloc}$ represents the number of bits allocated to the compressed moving image data per unit time.

The picture type Ptype includes three pictures types: an intra-coded (I) picture, a predictive-coded (P) picture, and a bidirectionally-coded (B) picture.

The prediction type Pred includes four types of prediction processing: intra prediction processing, forward prediction processing, backward prediction processing, and weighted prediction processing. The intra prediction processing is prediction processing of performing encoding only using intra-frame information concerning a picture to be encoded. The forward prediction processing is prediction processing of performing encoding with reference to a picture preceding, along the time axis, a picture to be encoded. The backward prediction processing is prediction processing of performing encoding with reference to a picture following, along the time axis, a picture to be encoded. The weighted prediction processing is processing of adaptively applying a weighting factor to a luminance component of a reference picture to predict a luminance component of a picture to be encoded.

The moving-image difficulty-level calculation unit 26 calculates a moving-image difficulty level Dmovie according to the corrected-still-image difficulty levels Da' and Db' supplied from the still-image difficulty-level correction unit 23 and the change of the combination ratio r along the time axis, which is supplied from the combining unit 24, and supplies the moving-image difficulty level Dmovie to the encoding control unit 27. Specifically, the moving-image difficulty-level calculation unit 26 calculates the moving-image difficulty level Dmovie using equation (4) as follows:

$$Dmovie=(r-1)\times Da'+r\times Db' \quad (4)$$

The encoding control unit 27 sets the above-described encoding control parameters according to the information about the combination ratio r supplied from the combining unit 24 and the moving-image difficulty level Dmovie supplied from the moving-image difficulty-level calculation unit 26, and controls operational characteristics of the encoding unit 25.

Figure 3:
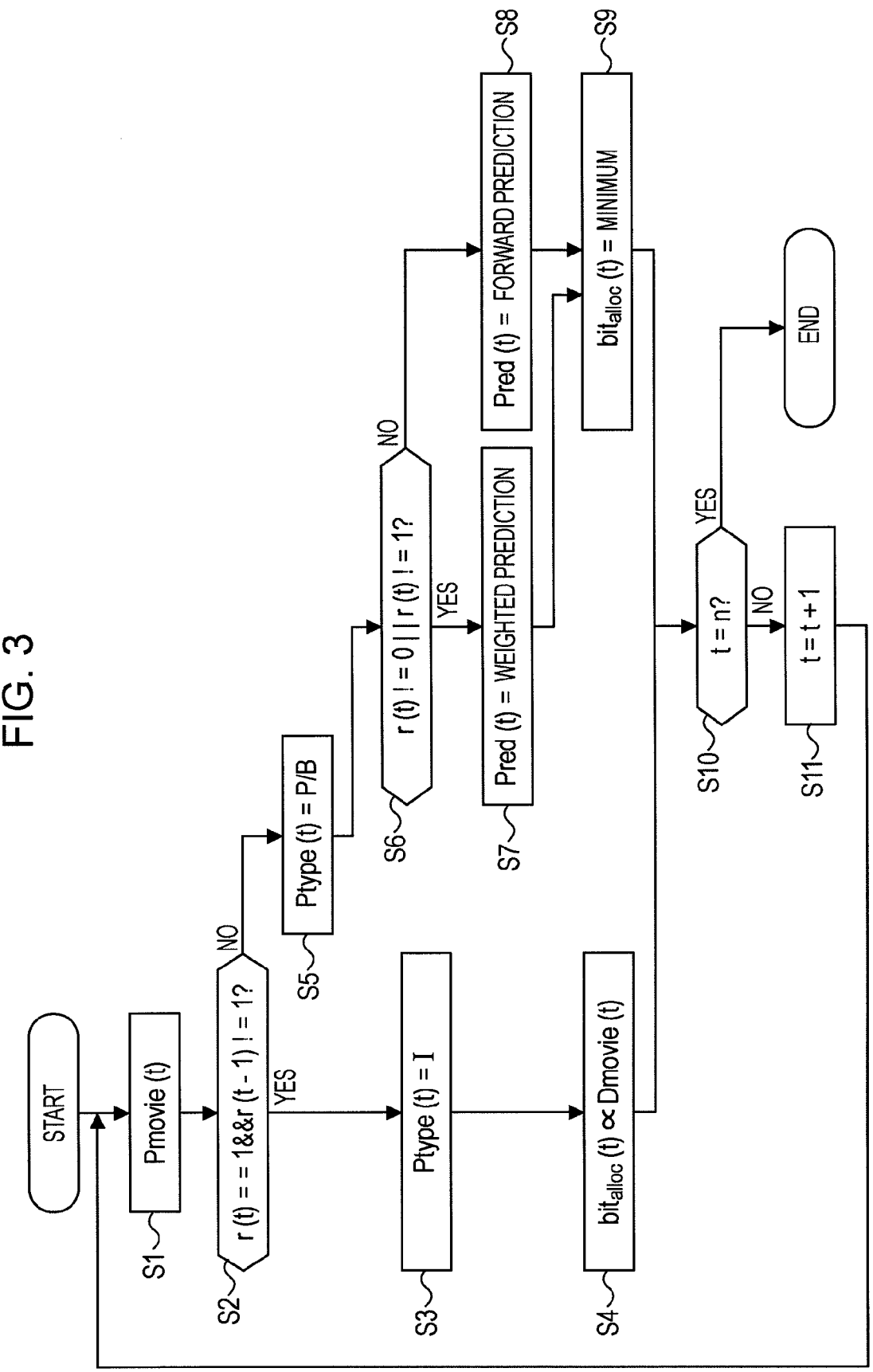
FIG. 3 is a flowchart showing a process performed by an encoding control unit.

Specifically, for example, the encoding control unit 27 sets an encoding control parameter according to a flowchart shown in FIG. 3 according to the moving-image difficulty level Dmovie and the combination ratio r changed along the time axis.

In processing steps of the flowchart shown in FIG. 3, the t-th picture of pictures arranged in a moving image Pmovie along the time axis is denoted by Pmovie(t). The combination ratio r and moving-image difficulty level Dmovie associated with the picture Pmovie(t) are denoted by r(t) and Dmovie(t), respectively. Encoding control parameters, that is, an allocated bit rate, a picture type, and a prediction type, associated with the picture Pmovie(t) are denoted by $Bit_{alloc}(t)$, Ptype(t), and Pred(t), respectively. The moving image Pmovie is formed of 0th to n-th pictures.

In step S1, the encoding control unit 27 sets a current, subject picture of the moving image Pmovie, supplied from the combining unit 24 to the encoding unit 25, to a picture Pmovie(t).

In step S2, the encoding control unit 27 determines whether or not a scene change has completed. Specifically, the encoding control unit 27 determines whether or not a condition that the combination ratio r(t) associated with the current picture Pmovie(t) has a value of 1 and that the combination ratio r(t−1) associated with the preceding picture Pmovie(t−1) has a value other than 1 is satisfied. If this condition is satisfied, the encoding control unit 27 determines that the current picture is a picture immediately after a scene cut or scene fade has completed. That is, the encoding control unit 27 determines that a scene change has completed, and then proceeds to step S3. If this condition is not satisfied, the encoding control unit 27 determines that a scene change has not completed, and then proceeds to step S5.

In step S3, the encoding control unit 27 sets the picture type Ptype(t) associated with the current picture Pmovie(t) to "I picture", and then proceeds to step S4.

In step S4, the encoding control unit 27 sets the allocated bit rate $Bit_{alloc}(t)$ according to the moving-image difficulty level Dmovie(t) associated with the current picture Pmovie (t), and then proceeds to step S10.

In step S5, the encoding control unit 27 sets the picture type Ptype(t) associated with the current picture Pmovie(t) to "P picture" or "B picture", and then proceeds to step S6.

In step S6, the encoding control unit 27 determines whether or not the current picture Pmovie(t) is in a scene fade. Specifically, the encoding control unit 27 determines whether or not a condition that the combination ratio r(t) associated with the current picture Pmovie(t) has a value other than 0 or 1 is satisfied. If this condition is satisfied, the encoding control unit 27 determines that the current picture Pmovie(t) is in a scene fade, and then proceeds to step S7. If this condition is not satisfied, the encoding control unit 27 determines that the current picture Pmovie(t) is not in a scene fade, and then proceeds to step S8.

In step S7, the encoding control unit 27 sets the prediction type Pred(t) associated with the current picture Pmovie(t) to "weighted prediction processing", and then proceeds to step S9. As described above, the weighted prediction processing is processing of adaptively applying a weighting factor to a luminance component of a reference picture to predict a luminance component of a picture to be encoded. The weighted prediction processing is thus effective to reduce degradation in image quality of an encoded image, particularly, in a scene fade with temporally changing brightness. Accordingly, the encoding control unit 27 can easily set a prediction type suitable for the picture Pmovie(t) that is determined in step S6 to be in a scene fade.

In step S8, the encoding control unit 27 sets the prediction type Pred(t) associated with the current picture Pmovie(t) to "forward prediction processing", and then proceeds to step S9. The forward prediction processing is processing of predicting the luminance component of the reference picture directly as the luminance component of the subject picture, unlike the weighted prediction processing described above. The amount of computational processing involved in the forward prediction processing is smaller than that in the weighted prediction processing described above, and therefore the forward prediction processing is effective, particularly, in a scene with a less temporally changing luminance component. Accordingly, the encoding control unit 27 can set a prediction type, which is suitable for a moving image formed of a sequence of motionless still images, for the picture Pmovie(t) that is determined in step S6 not to be in a scene fade.

In step S9, the encoding control unit 27 sets the allocated bit rate $Bit_{alloc}(t)$ associated with the current picture Pmovie (t) to a minimum value, and then proceeds to step S10.

In step S10, the encoding control unit 27 determines whether or not the value t, which represents a picture number of the moving image Pmovie, is equal to a value n, which represents the last picture number in the moving image Pmovie along the time axis. If the value t is equal to the value n, the encoding control unit 27 ends the process. If the value t is not equal to the value n, the encoding control unit 27 proceeds to step S11.

In step S11, the encoding control unit 27 updates the value t of the moving image Pmovie to a value t+1, and then returns to step S1.

Figure 4:
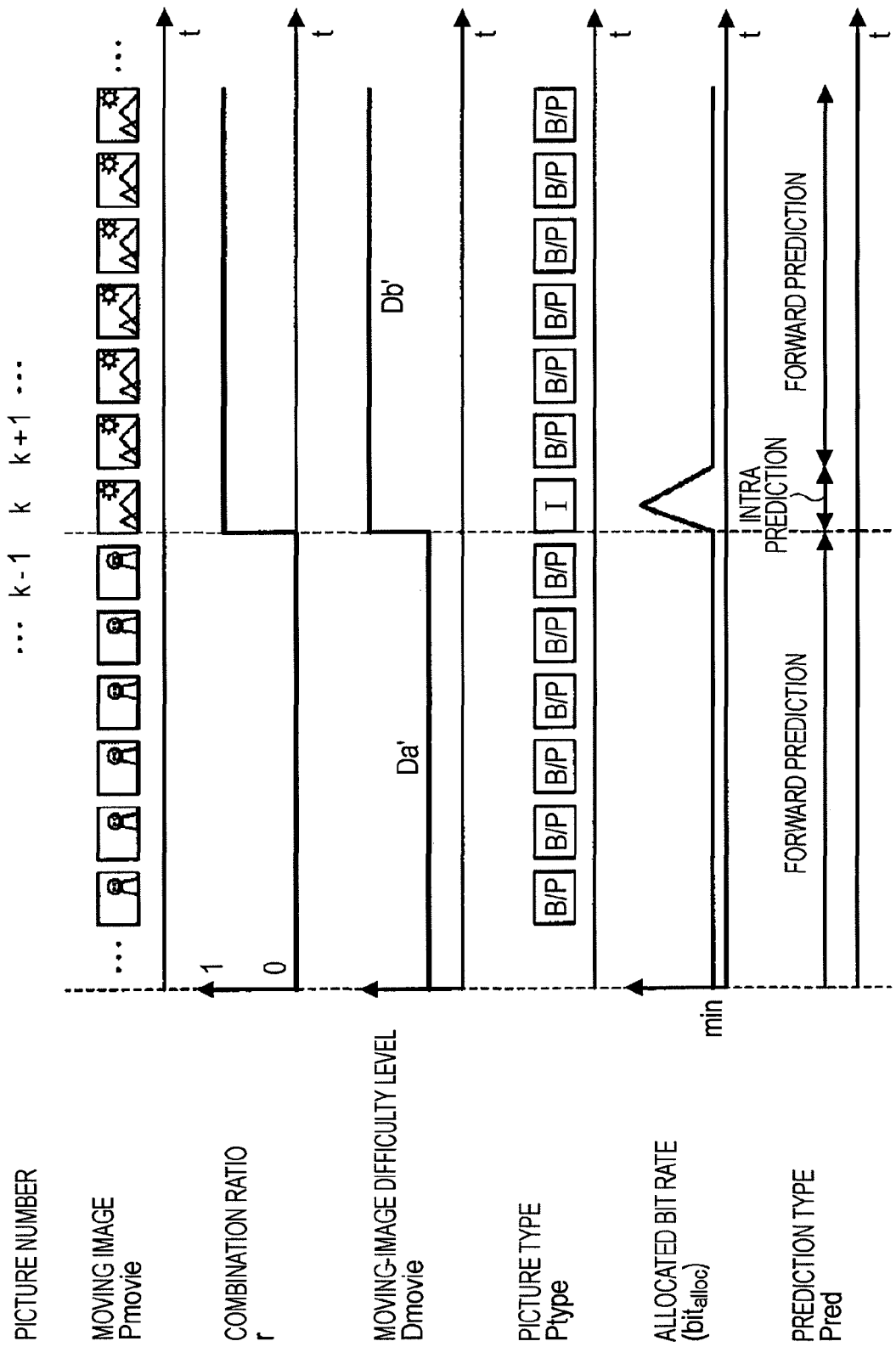
FIG. 4 is a diagram showing an operation of the encoding control unit for setting an encoding control parameter for a moving image involving a scene cut.

In the encoding control unit 27 that controls the encoding unit 25 according to the flowchart described above, the encoding control parameters are set for a moving image Pmovie including a scene cut in a manner shown in, for example, FIG. 4.

FIG. 4 shows a scene cut for providing instantaneous change from the still image data item Pa to the still image data item Pb when the picture number t of the moving image Pmovie has a value k.

In such a scene cut, when the picture number t has a value smaller than the value k, a combination ratio r having a value of 0 is supplied to the encoding control unit 27 from the combining unit 24, and a moving-image difficulty level Dmovie having the value Da' is supplied to the encoding control unit 27 from the moving-image difficulty-level calculation unit 26. When the picture number t has a value equal to or more than the value k, a combination ratio r having a value of 1 is supplied to the encoding control unit 27 from the combining unit 24, and a moving-image difficulty level Dmovie having the value Db' is supplied to the encoding control unit 27 from the moving-image difficulty-level calculation unit 26.

In the encoding control unit 27 supplied with the combination ratio r and the moving-image difficulty level Dmovie in the manner described above, the encoding control parameters associated with each picture Pmovie(t) are set as follows.

For the picture Pmovie(k) with the picture number t equal to the value k, the encoding control unit 27 proceeds to step S3 from the determination processing of step S2, and sets the picture type Ptype(k) to "I picture". In step S4, the encoding control unit 27 sets the allocated bit rate $Bit_{alloc}(k)$ according to the moving-image difficulty level Dmovie(k).

For a picture Pmovie(t) with a picture number t equal to a value other than the value k, the encoding control unit 27 proceeds to step S5 from step S2, and sets the picture type Ptype(t) to "P picture" or "B picture". The encoding control unit 27 proceeds to step S8 from the determination processing of step S6, and sets the prediction type Pred(t) to "forward prediction processing". In step S9, the encoding control unit 27 sets the allocated bit rate $Bit_{alloc}(t)$ to a minimum value.

Figure 5:
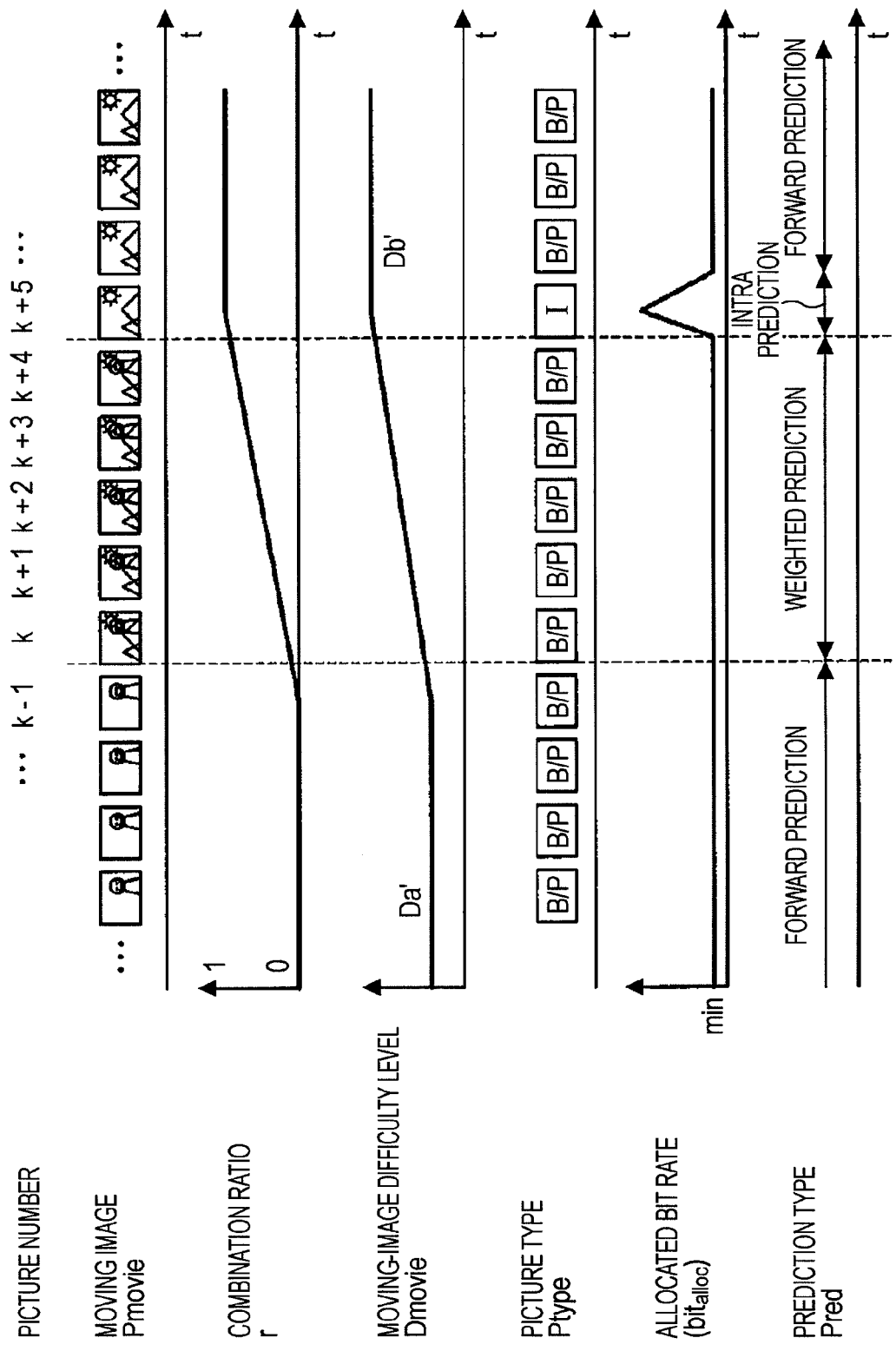
FIG. 5 is a diagram showing an operation of the encoding control unit for setting an encoding control parameter for a moving image involving a scene fade.

Further, the encoding control unit 27 sets the encoding control parameters for a moving image Pmovie involving a scene fade in a manner shown in, for example, FIG. 5.

FIG. 5 shows a scene in which a fade from the still image data item Pa to the still image data item Pb starts when the picture number t of the moving image Pmovie has a value k and in which the fade ends when the picture number t of the moving image Pmovie has a value k+4.

In such a scene fade, when the picture number t has a value smaller than the value k, a combination ratio r having a value of 0 is supplied to the encoding control unit 27 from the combining unit 24, and a moving-image difficulty level Dmovie having the value Da' is supplied to the encoding control unit 27 from the moving-image difficulty-level calculation unit 26. When the picture number t has a value ranging from the value k to the value k+4, a combination ratio r having a value changing from "0" to "1" on a picture-by-picture basis is supplied to the encoding control unit 27 from the combining unit 24, and a moving-image difficulty level Dmovie having a value changing from the value Da' to the value Db' on a picture-by-picture basis is supplied to the encoding control unit 27 from the moving-image difficulty-level calculation unit 26. When the picture number t has a value greater than the value k+4, a combination ratio r having a value of 1 is supplied to the encoding control unit 27 from the combining unit 24, and a moving-image difficulty level Dmovie having the value Db' is supplied to the encoding control unit 27 from the moving-image difficulty-level calculation unit 26.

In the encoding control unit 27 supplied with the combination ratio r and the moving-image difficulty level Dmovie in this manner, the encoding control parameters associated with each picture Pmovie(t) are set as follows.

For a picture Pmovie(t) with a picture number t having a value smaller than the value k and a picture Pmovie(t) with a picture number t having a value equal to or greater than a value k+6, the encoding control unit 27 proceeds to step S5 from the determination processing of step S2, and sets the picture type Ptype(t) to "P picture" or "B picture". Then, the encoding control unit 27 proceeds to step S8 from the determination processing of step S6, and sets the prediction type Pred(t) to "forward prediction processing". In step S9, the encoding control unit 27 sets the allocated bit rate $Bit_{alloc}(t)$ to a minimum value.

For a picture Pmovie(t) with a picture number t having a value ranging from the value k to the value k+4, the encoding control unit 27 proceeds to step S5 from the determination processing of step S2, and sets the picture type Ptype(t) to "P picture" or "B picture". Then, the encoding control unit 27 proceeds to step S7 from the determination processing of step S6, and sets the prediction type Pred(t) to "weighted prediction processing". In step S9, the encoding control unit 27 sets the allocated bit rate $Bit_{alloc}(t)$ to a minimum value.

For the picture Pmovie(t+5) with the picture number t having a value equal to a value k+5, the encoding control unit 27 proceeds to step S3 from the determination of step S2, and sets the picture type Ptype(t+5) to "I picture". In step S4, the encoding control unit 27 sets the allocated bit rate $Bit_{alloc}(t+5)$ according to the moving-image difficulty level Dmovie(t+5).

Instead of encoding of a moving image according to an encoding control parameter defined by the encoding control unit 27 in the manner described above, the encoding unit 25 may use an existing moving-image encoding method to detect a motion vector from a moving image obtained from the combining unit 24 and to set an encoding control parameter according to the detected motion vector to encode the moving image. In this case, however, there is a demand for high precision detection of a motion vector and complex determination in order to achieve precise detection of a picture corresponding to a scene change to provide high image quality, resulting in an increase in the size of a circuit for performing encoding processing.

For the above reason, in the image processing unit 20, the encoding control unit 27 sets an encoding control parameter for controlling a characteristic of a moving-image encoding process according to the combination ratio r and image difficulty level Dmovie of a moving image. It is therefore possible to encode a moving image, which is generated by combining still image data, using a relatively simple technique at a higher efficiency while maintaining a high level of image quality to generate encoded data. In other words, the image processing unit 20 can provide high-efficiency encoding, while maintaining a high level of image quality of still images included in the moving image, without increasing a circuit size.

Figure 2:
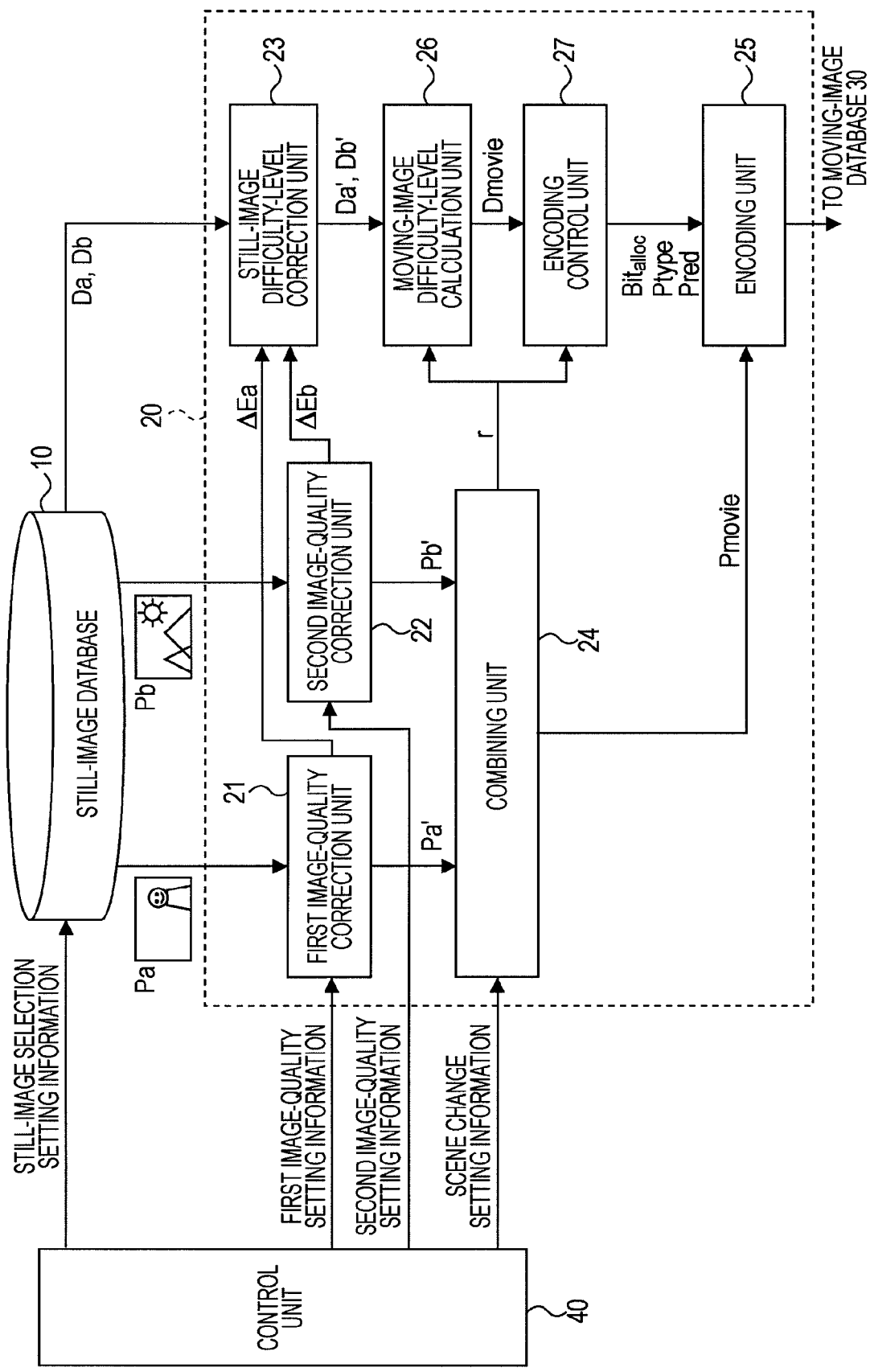
FIG. 2 is a block diagram showing a structure of processing sections included in the image processing unit.

In the process of setting an encoding control parameter according to the flowchart shown in FIG. 2 described above, it is assumed that the picture type Ptype(t) for an arbitrary picture Pmovie(t) can be determined as desired. In a general encoding method such as MPEG2 or AVC, however, a picture type is determined in advance on the basis of a group of picture (GOP) structure. A process performed by the encoding control unit 27 that controls the encoding unit 25 to perform encoding according to such an encoding method, in which the picture type of each of pictures arranged along the time axis is determined in advance on the basis of a GOP structure or the like, will be described with reference to flowchart shown in FIG. 6.

Figure 6:
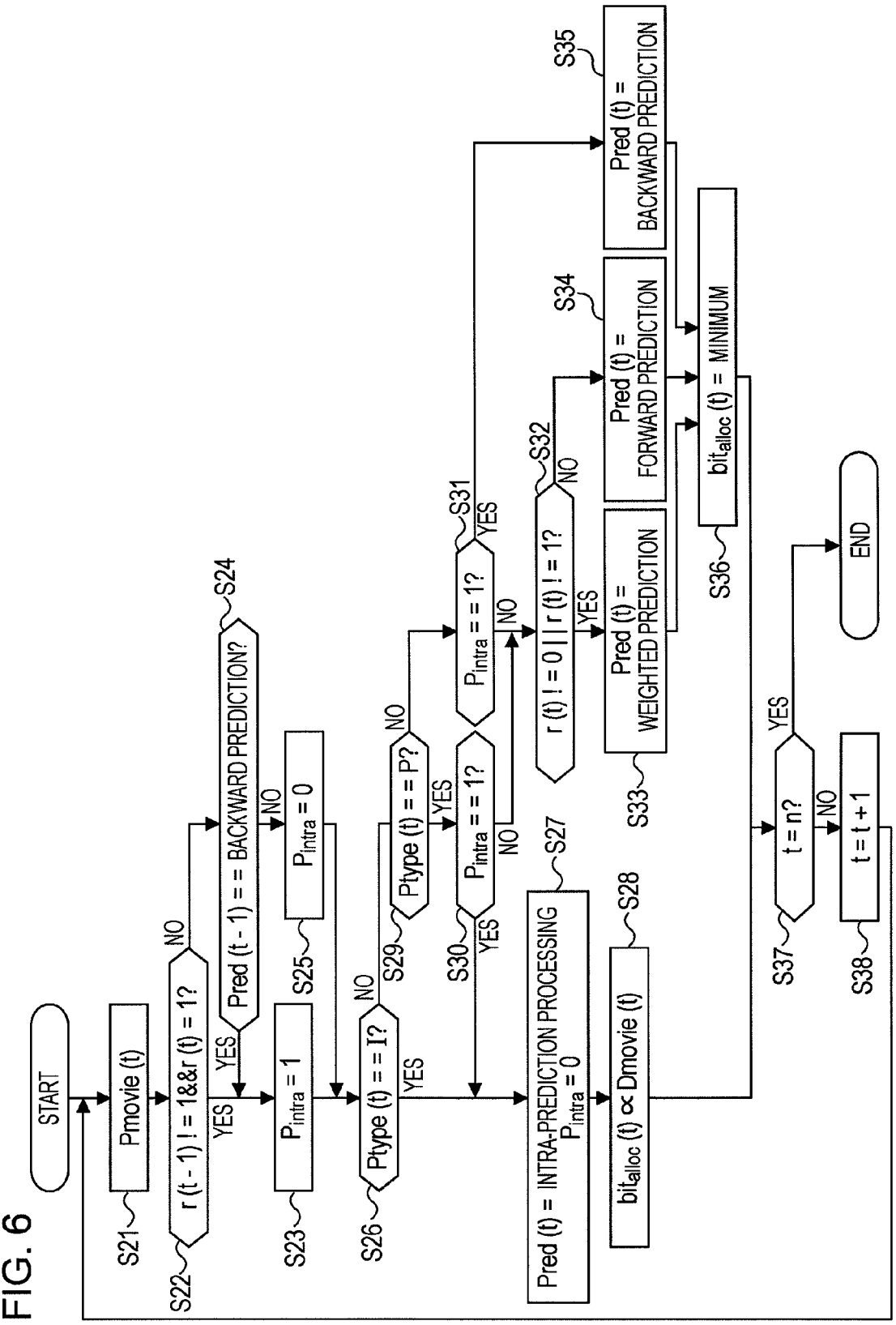
FIG. 6 is a flowchart showing a process performed by the encoding control unit.

In processing steps of a process shown in the flowchart of FIG. 6, the t-th picture of pictures arranged in a moving image Pmovie along the time axis is denoted by Pmovie(t). The combination ratio r and moving-image difficulty level Dmovie associated with the picture Pmovie(t) are denoted by r(t) and Dmovie(t), respectively. Encoding control parameters, that is, an allocated bit rate, a picture type, and a picture prediction type, associated with the picture Pmovie(t), are denoted by $Bit_{alloc}(t)$, Ptype(t), and Pred(t), respectively. As described above, the picture type Ptype(t) is set in advance to any of "I picture", "P picture", and "B picture". A flag $P_{intra}$, which is used in the following processing steps, is a flag indicating whether to perform intra prediction processing when the picture type Ptype(t) is "P picture".

The moving image Pmovie is formed of 0th to n-th pictures.

In step S21, the encoding control unit 27 sets a current, subject picture of the moving image Pmovie, supplied from the combining unit 24 to the encoding unit 25, to a picture Pmovie(t).

In step S22, the encoding control unit 27 determines whether or not a scene change has completed. Specifically, the encoding control unit 27 determines whether or not a condition that the combination ratio r(t) associated with the current picture Pmovie(t) has a value of 1 and the combination ratio r(t−1) associated with the preceding picture Pmovie (t−1) has a value other than 1 is satisfied. If this condition is satisfied, the encoding control unit 27 determines that the current picture Pmovie(t) is a picture immediately after a scene cut or scene fade has completed, and proceeds to step S23. If this condition is not satisfied, the encoding control unit 27 proceeds to step S24.

In step S23, the encoding control unit 27 sets the flag $P_{intra}$ to a value of 1, and proceeds to step S26.

In step S24, the encoding control unit 27 determines whether or not the prediction type Pred(t−1) of the preceding picture Pmovie(t−1) is "backward prediction processing". If the prediction type Pred(t−1) is "backward prediction processing", the encoding control unit 27 proceeds to step S23. If the prediction type Pred(t−1) is not "backward prediction processing", the encoding control unit 27 proceeds to step S25.

In step S25, the encoding control unit 27 sets the flag $P_{intra}$ to a value of 0, and then proceeds to step S26.

In step S26, the encoding control unit 27 determines whether or not the picture type Ptype(t) of the current picture Pmovie(t) is "I picture". If the picture type Ptype(t) is "I picture", the encoding control unit 27 proceeds to step S27. If the picture type Ptype(t) is not "I picture", the encoding control unit 27 proceeds to step S29.

In step S27, the encoding control unit 27 sets the prediction type Pred(t) associated with the current picture Pmovie(t) to "intra prediction processing", and sets the flag $P_{intra}$ to a value of 0. Then, the encoding control unit 27 proceeds to step S28.

In step S28, the encoding control unit 27 sets the allocated bit rate $Bit_{alloc}(t)$ according to the moving-image difficulty level Dmovie(t) associated with the current picture Pmovie (t), and proceeds to step S37.

In step S29, the encoding control unit 27 determines whether or not the picture type Ptype(t) of the current picture Pmovie(t) is "P picture". If the picture type Ptype(t) is "P picture", the encoding control unit 27 proceeds to step S30. If the picture type Ptype(t) is not "P picture", the encoding control unit 27 proceeds to step S31.

In step S30, the encoding control unit 27 determines whether or not the flag $P_{intra}$ has a value of 1. If the flag $P_{intra}$ has a value of 1, the encoding control unit 27 proceeds to step S27. If the flag $P_{intra}$ has a value of 0, the encoding control unit proceeds to step S32.

In step S31, the encoding control unit 27 determines whether or not the flag $P_{intra}$ has a value of 1. If the flag $P_{intra}$ has a value of 1, the encoding control unit 27 proceeds to step S35. If the flag P*intra* has a value of 0, the encoding control unit proceeds to step S32.

In step S32, the encoding control unit 27 determines whether or not the current picture Pmovie(t) is in a scene fade. Specifically, the encoding control unit 27 determines whether or not a condition that the combination ratio r(t) associated with the current picture Pmovie(t) has a value other than 0 or 1 is satisfied. If this condition is satisfied, the encoding control unit 27 determines that the current picture Pmovie(t) is in a scene fade, and proceeds to step S33. If this condition is not satisfied, the encoding control unit 27 proceeds to step S34.

In step S33, the encoding control unit 27 sets the prediction type Pred(t) associated with the current picture Pmovie(t) to "weighted prediction processing", and proceeds to step S36.

In step S34, the encoding control unit 27 sets the prediction type Pred(t) associated with the current picture Pmovie(t) to "forward prediction processing", and proceeds to step S36.

In step S35, the encoding control unit 27 sets the prediction type Pred(t) associated with the current picture Pmovie(t) to "backward prediction processing", and proceeds to step S36. The reason that the prediction type Pred(t) is set to "backward prediction processing" is that there is no reference picture suitable for forward prediction processing.

In step S36, the encoding control unit 27 sets the allocated bit rate $Bit_{alloc}(t)$ associated with the current picture Pmovie (t) to a minimum value, and proceeds to step S37.

In step S37, the encoding control unit 27 determines whether or not the value t, which represents a picture number of the moving image Pmovie, is equal to a value n, which represents the last picture number in the moving image Pmovie along the time axis. If the value t is equal to the value n, the encoding control unit 27 ends the process. If the value t is not equal to the value n, the encoding control unit 27 proceeds to step S38.

In step S38, the encoding control unit 27 updates the value t of the moving image Pmovie to a value t+1, and then returns to step S21.

Figure 7:
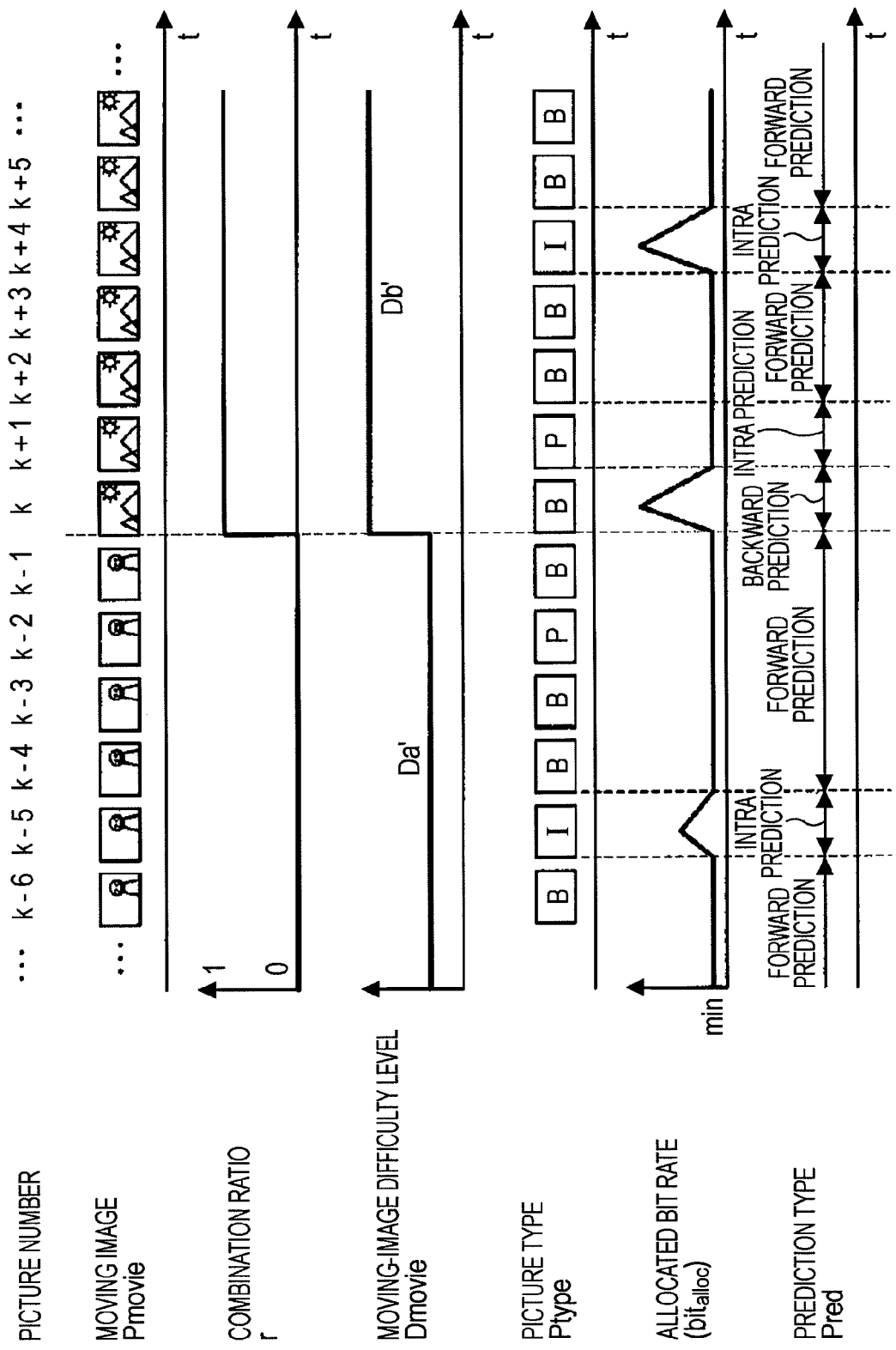
FIG. 7 is a diagram showing an operation of the encoding control unit for setting an encoding control parameter for a moving image involving a scene cut.

In the encoding control unit 27 that controls the encoding unit 25 according to the flowchart described above, the encoding control parameters are set for a moving image Pmovie including a scene cut in a manner shown in, for example, FIG. 7.

In such a scene cut, when the picture number t has a value smaller than a value k, a combination ratio r having a value of 0 is supplied to the encoding control unit 27 from the combining unit 24, and a moving-image difficulty level Dmovie having the value Da' is supplied to the encoding control unit 27 from the moving-image difficulty-level calculation unit 26. When the picture number t has a value equal to or more than the value k, a combination ratio r having a value of 1 is supplied to the encoding control unit 27 from the combining unit 24, and a moving-image difficulty level Dmovie having the value Db' is supplied to the encoding control unit 27 from the moving-image difficulty-level calculation unit 26.

It is assumed that the picture type Ptype(t) is set in advance to an arrangement of groups each having a total of nine pictures arranged along the time axis in the order of I picture, B picture, B picture, P picture, B picture, B picture, P picture, B picture, and B picture. In the example shown in FIG. 7, picture numbers t of I pictures located at the top of the groups are set to values k−5 and k+4.

In a scene cut having the conditions described above, the encoding control unit 27 sets the allocated bit rate $Bit_{alloc}(t)$ and prediction type Pred(t) of each picture Pmovie(t) according to the flowchart shown in FIG. 6 as follows.

For the pictures with the picture number t equal to the values k−5 and k+4, that is, the pictures Pmovie(t) of I picture, the encoding control unit 27 proceeds to step S27, and sets the prediction types Pred(t) to "intra prediction processing". The encoding control unit 27 proceeds to step S28, and sets the allocated bit rates $Bit_{alloc}(t)$ according to the moving-image difficulty levels Dmovie(t).

For the pictures with the picture number t equal to values k−4 to k−1, that is, the pictures Pmovie(t) that are placed before the cut scene and for which the picture types Ptype(t) are "P picture" and "B picture", the encoding control unit 27 proceeds to step S25, and sets the flag $P_{intra}$ to a value of 0. Afterwards, the encoding control unit 27 proceeds to step S34, and sets the prediction types Pred(t) to "forward prediction processing". Then, the encoding control unit 27 proceeds to step S36, and sets the allocated bit rates $Bit_{alloc}(t)$ to a minimum value.

For the picture with the picture number t equal to the value k, that is, the picture Pmovie(k) that is placed immediately after the scene cut, the encoding control unit 27 proceeds to step S23, and sets the flag $P_{intra}$ to a value of 1. Since the picture type Ptype(k) is "B picture", the encoding control unit 27 proceeds to step S35, and sets the prediction type Pred(k) to "backward prediction processing". Then, the encoding control unit 27 proceeds to step S36, and sets the allocated bit rate $Bit_{alloc}(k)$ to a minimum value.

For the picture with the picture number t equal to a value k+1, since the prediction type Pred(k) of the preceding picture Pmovie(k) is "backward prediction processing", the encoding control unit 27 proceeds to step S23, and sets the flag $P_{intra}$ to a value of 1. Since the picture type Ptype(k+1) of the current picture Pmovie(k+1) is "P picture", the encoding control unit 27 proceeds to step S27, and sets the prediction type Pred(k+1) to "intra prediction processing". Then, the encoding control unit 27 proceeds to step S28, and sets the allocated bit rate $Bit_{alloc}(k+1)$ according to the moving-image difficulty level Dmovie(k+1).

For pictures that are placed after the scene cut, for which the picture type Ptype(t) is "P picture" or "B picture", and to which a previous picture after the scene cut is an I picture or a P picture, namely, the pictures Pmovie(k+2), Pmovie(k+3), and Pmovie(k+5), the encoding control unit 27 proceeds to step S25, and sets the flag $P_{intra}$ to a value of 0. Afterwards, the encoding control unit 27 proceeds to step S34, and sets the prediction types Pred(k+2), Pred(k+3), and Pred(k+5) to "forward prediction processing". Then, the encoding control unit 27 proceeds to step S35, and sets the allocated bit rates $Bit_{alloc}(k+2)$, $Bit_{alloc}(k+3)$, and $Bit_{alloc}(k+5)$ to a minimum value.

Furthermore, the encoding control unit 27 sets an encoding control parameter for a moving image Pmovie involving a scene fade in a manner shown in, for example, FIG. 8.

FIG. 8 is a diagram showing a scene in which a fade from the still image data item Pa to the still image data item Pb starts when the picture number t of the moving image Pmovie has a value k and in which the fade ends when the picture number t of the moving image Pmovie has a value k+4.

In such a scene fade, when the picture number t has a value equal to or less than a value k−1, a combination ratio r having a value of 0 is supplied to the encoding control unit 27 from the combining unit 24, and a moving-image difficulty level Dmovie having the value Da' is supplied to the encoding control unit 27 from the moving-image difficulty-level calculation unit 26. When the picture number t has a value ranging from the value k to the value k+4, a combination ratio r having a value changing from "0" to "1" on a picture-by-picture basis is supplied to the encoding control unit 27 from the combining unit 24, and a moving-image difficulty level Dmovie having a value gradually changing from the value Da' to the value Db' on a picture-by-picture basis is supplied to the encoding control unit 27 from the moving-image difficulty-level calculation unit 26. When the picture number t has a value greater than the value k+4, a combination ratio r having a value of 1 is supplied to the encoding control unit 27 from the combining unit 24, and a moving-image difficulty level Dmovie having the value Db' is supplied to the encoding control unit 27 from the moving-image difficulty-level calculation unit 26.

It is assumed that the picture type Ptype(t) is set in advance to an arrangement of groups each having a total of six pictures arranged along the time axis in the order of I picture, B picture, B picture, P picture, B picture, and B picture. In the example shown in FIG. 8, picture numbers t of I pictures located at the top of the groups are set to values k−3 and k+3.

In a scene fade having the conditions described above, the encoding control unit 27 sets the allocated bit rate $Bit_{alloc}(t)$ and prediction type Pred(t) of each picture Pmovie(t) according to the flowchart shown in FIG. 6 as follows.

For the pictures with the picture number t equal to the values k−3 and k+3, that is, the pictures Pmovie(t) of I picture, the encoding control unit 27 proceeds to step S27, and sets the prediction types Pred(t) to "intra prediction processing". The encoding control unit 27 proceeds to step S28, and sets the allocated bit rates $Bit_{alloc}(t)$ according to the moving-image difficulty levels Dmovie(t).

For the pictures that are placed before the start of the scene fade and that are "P picture" and "B picture", namely, the pictures Pmovie(k−4), Pmovie(k−2), and Pmovie(k−1), the encoding control unit 27 proceeds to step S25, and sets the flag $P_{intra}$ to a value of 0. Then, the encoding control unit 27 proceeds to step S34, and sets the prediction types Pred(k−4), Pred(k−2), and Pred(k−1) to "forward prediction processing". Then, the encoding control unit 27 proceeds to step S36, and sets the allocated bit rates $Bit_{alloc}(k-4)$, $Bit_{alloc}(k-2)$, and $Bit_{alloc}(k-1)$ to a minimum value.

For the pictures that are placed during the scene fade and that are "P picture" and "B picture", namely, the pictures Pmovie(k), Pmovie(k+1), Pmovie(k+2), and Pmovie(k+4), the encoding control unit 27 proceeds to step S25, and sets the flag $P_{intra}$ to a value of 0. Afterwards, in step S33, the encoding control unit 27 sets the prediction types Pred(k), Pred(k+1), Pred(k+2), and Pred(k+4) to "weighted prediction processing". Then, the encoding control unit 27 proceeds to step S36, and sets the allocated bit rates $Bit_{alloc}(k)$, $Bit_{alloc}(k+1)$, $Bit_{alloc}(k+2)$, and $Bit_{alloc}(k+4)$ to a minimum value.

For the picture that is placed immediately after the scene fade, namely, the picture Pmovie(k+5), the encoding control unit 27 proceeds to step S23, and sets the flag $P_{intra}$ to a value of 1. Since the picture type Ptype(k) is "B picture", afterwards, the encoding control unit 27 proceeds to step S35, and sets the prediction type Pred(k+5) to "backward prediction processing". Then, the encoding control unit 27 proceeds to step S36, and sets the allocated bit rate $Bit_{alloc}(k+5)$ to a minimum value.

For the picture with the picture number t equal to a value k+6, since the prediction type Pred(k+5) of the preceding picture Pmovie(k+5) is "backward prediction processing", the encoding control unit 27 proceeds to step S23, and sets the flag $P_{intra}$ to a value of 1. Since the picture type Ptype(k+6) of the current picture Pmovie(k+6) is "P picture", the encoding control unit 27 proceeds to step S27, and sets the prediction type Pred(k+6) to "intra prediction processing". Then, the encoding control unit 27 proceeds to step S28, and sets the allocated bit rate $Bit_{alloc}(k+6)$ according to the moving-image difficulty level Dmovie(k+6).

For the pictures that are placed after the scene fade, for which the picture type Ptype(t) of the current picture Pmovie(t) is "P picture" or "B picture", and to which a previous picture after the scene fade is an I picture or a P picture, namely, the pictures Pmovie(k+7) and Pmovie(k+8), the encoding control unit 27 proceeds to step S25, and sets the flag $P_{intra}$ to a value of 0. Afterwards, the encoding control unit 27 proceeds to step S36, and sets the allocated bit rate $Bit_{alloc}(k+7)$ and $Bit_{alloc}(k+8)$ to a minimum value.

Accordingly, the encoding control unit 27 controls an encoding control parameter according to the combination ratio r, moving-image difficulty level Dmovie, and picture type Ptype(t) for a moving image. Therefore, encoded data complying with an encoding method in which the picture type of each of pictures arranged along the time axis is determined in advance can be generated at high encoding efficiency, while maintaining a high image quality, from a moving image generated by combining the still image data items Pa and Pb subjected to image-quality correction processing.

The image processing apparatus 1 may be implemented in dedicated hardware implementing the functions of the image processing unit 20 described above. Alternatively, a program for implementing the functions of the processing sections included in the image processing unit 20 described above may be stored in a storage medium such as a hard disk, and the control unit 40 may read and execute the program to implement the function of the image processing unit 20.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    obtaining means for obtaining a first still image, a first difficulty level indicating a complexity of the first still image, a second still image, and a second difficulty level indicating a complexity of the second still image;
    combining means for combining the first still image and second still image obtained by the obtaining means at a combination ratio which is changed along a time axis to generate a moving image;
    encoding means for performing an encoding operation to encode the moving image generated by the combining means;
    moving-image difficulty-level calculating means for calculating a moving-image difficulty level indicating a complexity of the moving image according to the first difficulty level and second difficulty level obtained by the obtaining means and the combination ratio changed along the time axis; and
    control means for controlling a characteristic including an allocated bit rate of the encoding operation performed by the encoding means according to the combination ratio changed along the time axis and the moving-image difficulty level calculated by the moving-image difficulty level calculating means,
    wherein the control means determines whether the moving image is an I type according to the combination ratio.

2. The image processing apparatus according to claim 1, further comprising:
    first image-quality correcting means for performing image-quality correction processing on the first still image obtained by the obtaining means; and
    difficulty level correcting means for correcting the first difficulty level according to the image-quality correction processing performed on the first still image by the first image-quality correcting means,
    wherein the combining means combines the first still image obtained by the obtaining means and subjected to the image-quality correction processing by the first image-quality correcting means and the second still image obtained by the obtaining means at a combination ratio which is changed along the time axis to generate a moving image, and
    wherein the moving-image difficulty level calculating means calculates the moving-image difficulty level according to the first difficulty level obtained by the obtaining means and corrected by the difficulty level correcting means, the second difficulty level obtained by the obtaining means, and the combination ratio changed along the time axis.

3. The image processing apparatus according to claim 2, further comprising second image-quality correction processing means for performing image-quality correction processing on the second still image obtained by the obtaining means,
    wherein the combining means combines the first still image obtained by the obtaining means and subjected to the image-quality correction processing by the first image-quality correction means and the second still image obtained by the obtaining means and subjected to the image-quality correction processing by the second image-quality correction means at a combination ratio which is changed along the time axis to generate a moving image,
    wherein the difficulty level correcting means corrects the first difficulty level according to the image-quality correction processing performed on the first still image by the first image-quality correcting means, and corrects the second difficulty level according to the image-quality correction processing performed on the second still image by the second image-quality correcting means, and
    wherein the moving-image difficulty level calculating means calculates the moving-image difficulty level according to the first difficulty level obtained by the obtaining means and corrected by the difficulty level correcting means, the second difficulty level obtained by the obtaining means and corrected by the difficulty level correcting means, and the combination ratio changed along the time axis.

4. The image processing apparatus according to claim 1, wherein the encoding means encodes the moving image generated by the combining means according to an encoding method that is based on a picture type determined in advance to encode each of pictures arranged along a time axis, and wherein the control means controls the characteristic of the encoding operation performed by the encoding means according to the combination ratio changed along the time axis, the moving-image difficulty level calculated by the moving-image difficulty level calculating means, and a picture type of each of pictures included in the moving image to be encoded by the encoding means.

5. An image processing method comprising the steps of:

obtaining, using predetermined obtaining means, a first still image, a first difficulty level indicating a complexity level of the first still image, a second still image, and a second difficulty level indicating a complexity level of the second still image;

combining the first still image and the second still image at a combination ratio which is changed along a time axis to generate a moving image;

calculating a moving-image difficulty level indicating a complexity level of the moving image according to the first difficulty level, the second difficulty level, and the combination ratio changed along the time axis;

setting an encoding control parameter including an allocated bit rate according to the combination ratio changed along the time axis and the moving-image difficulty level;

determining whether the moving image is an I type according to the combination ratio; and encoding the moving image according to the encoding control parameter.

6. A non-transitory computer-readable storage medium storing a program for causing a computer to execute image processing, the program comprising the steps of:

obtaining, using predetermined obtaining means, a first still image, a first difficulty level indicating a complexity level of the first still image, a second still image, and a second difficulty level indicating a complexity level of the second still image;

combining the first still image and the second still image at a combination ratio which is changed along a time axis to generate a moving image;

calculating a moving-image difficulty level indicating a complexity level of the moving image according to the first difficulty level, the second difficulty level, and the combination ratio changed along the time axis;

setting an encoding control parameter including an allocated bit rate according to the combination ratio changed along the time axis and the moving-image difficulty level;

determining whether the moving image is an I type according to the combination ratio; and encoding the moving image according to the encoding control parameter.

7. An image processing apparatus comprising:

an obtaining unit configured to obtain a first still image, a first difficulty level indicating a complexity of the first still image, a second still image, and a second difficulty level indicating a complexity of the second still image;

a combining unit configured to combine the first still image and second still image obtained by the obtaining unit at a combination ratio which is changed along a time axis to generate a moving image;

an encoding unit configured to perform an encoding operation to encode the moving image generated by the combining unit;

a moving-image difficulty-level calculating unit configured to calculate a moving-image difficulty level indicating a complexity of the moving image according to the first difficulty level and second difficulty level obtained by the obtaining unit and the combination ratio changed along the time axis; and a control unit configured to control a characteristic including an allocated bit rate of the encoding operation performed by the encoding unit according to the combination ratio changed along the time axis and the moving-image difficulty level calculated by the moving-image difficulty level calculating unit, wherein the control unit determines whether the image is an I type according to the combination ratio.

* * * * *